United States Patent Office 3,360,434
Patented Dec. 26, 1967

3,360,434
METHOD FOR REDUCING BLOOD PRESSURE WITH PHENYLALANINE DERIVATIVES
Sidney Udenfriend and Albert Sjoerdsma, Bethesda, and Sydney Spector, Silver Spring, Md., assignors to the United States of America as represented by the Secretary of Health, Education, and Welfare
No Drawing. Filed Mar. 22, 1965, Ser. No. 441,870
5 Claims. (Cl. 167—65)

This invention relates to pharmaceutical compositions. In particular, the invention relates to pharmaceutical compositions which possess hypotensive activity and contain as the principal active ingredient certain derivatives of phenylalanines. The invention also relates to a method of reducing the blood pressure of warm-blooded animals utilizing the above compositions.

In accordance with the present invention, there are provided pharmaceutical compositions which can be utilized for lowering the blood pressure of warm-blooded animals and which contain as the active ingredient one of the compounds, α-methylphenylalanine, 3 - iodotyrosine of 3,5-diiodotyrosine. The above represented compounds may be utilized in the free form or in the form of non-toxic, pharmaceutically acceptable salts and such salts are included within the scope of this invention. Suitable salts are, for example, the pharmaceutically acceptable acid addition salts such as the hydrochloride and the like. Furthermore, the compounds may be utilized in their racemic or optically active d or l forms. The latter forms are preferred in those instances where the biological activity is greater in one enantiomorph than the other.

The hypotensive action of these compounds may be due to the inhibition of the natural synthesis of pressor amines in the body. This natural synthesis is believed to proceed through the sequence:

tyrosine→ dioxyphenylalanine (DOPA)
→dopamine→norepinephrine→epinephrine

The rate determining step appears to be the hydroxylation of tyrosine to DOPA and these compounds are all strong inhibitors of this enzymatic reaction.

As a hypotensive drug, the recommended dosage of the active ingredient is from about 25 mg. to about 500 mg. of the active ingredient two to four times per day. For convenience of administration and for assurance that the aforementioned dosage requirements are met in routine therapy, the active ingredient is provided in unitary form for administration and, preferably, either in unit dosage form such as tablets, capsules, powders, suspensions and the like or in a form readily subdivided into unit doses.

In the preparation of solid orally administrable compositions contemplated by the present invention, the active ingredient may be admixed with a non-toxic pharmaceutical carrier and dry filled into capsules or with the aid of suitable excipients such as binders, lubricants, disintegrating agents, fillers and the like, compressed into tablets, pellets, pills and the like using conventional formulating techniques. Such compositions may also contain preservatives, sequestering agents, flavoring agents and the like in order to enhance stability and provide an elegant and palatable preparation. Similarly, various liquid formulations suitable for either parenteral or oral administration can be readily prepared with the aid of suitable dispersing agents, suspending agents and the like.

If sustained release preparations are desired, i.e., preparations wherein the release of the active constituent is achieved over a period of from 8–12 hours, these may be readily prepared by coating the medicament, medicated seeds or tablets with conventional fatty or waxy materials used for this purpose. In such preparations the unit dosage of medicament may be increased to as high as 1000 milligrams, the particular amount being sufficient to provide a daily regimen within the range set forth hereinbelow.

In accordance with the method of reducing the blood pressure of warm-blooded animals, a dosage regimen of the active ingredient in either its racemic, optically active d or l forms or a non-toxic salt thereof is administered internally, preferably orally, to warm-blooded animals in an amount sufficient to produce the desired tranquilizing effect. Although the daily dosage of the active ingredient will vary depending on the particular ingredient employed, and other factors, a daily dosage of from about 50 mg. to about 2 g. provides satisfactory results.

The compounds constituting the active ingredients of the present invention may be prepared as described in the literature.

The following examples are illustrative of the invention.

EXAMPLE 1

*Effect on tissue levels of norepinephrine*

The reduction of levels of norepinephrine in various tissues by the various compounds usable in the claimed composition is tested as follows:

The drug is administered intraperitoneally to guinea pigs in the dosage and times shown below. The animals are sacrificed and the indicated tissue is analyzed for norepinephrine by the method of Shore and Olin, J. Pharm. and Expt. Therap. 122, 295 (1958). Each determination cited represents the mean value of four animals. Each was run against its own concurrent control group of animals.

TEST NO. 1

| Compound | Dosage | Norepinephrine Levels | | |
|---|---|---|---|---|
| | | Brain stem | Heart | Spleen |
| Control | | 0.50 | 1.54 | 1.50 |
| 3-iodotyrosine | 100 mg./kg. every 2 hours for 24 hours. | 0.22 | 1.00 | 1.36 |

TEST NO. 2

| Control | | 0.50 | 1.50 | 1.50 |
|---|---|---|---|---|
| 3,5-diiodotyrosine | One 100 mg./kg. dose 4 hours before test. | 0.25 | 1.0 | 1.0 |

TEST NO. 3

| Control | | 0.50 | 1.42 | 1.71 |
|---|---|---|---|---|
| α-Methylphenylalanine. | One 100 mg./kg. dose 4 hours before test. | 0.20 | 1.00 | 1.54 |

EXAMPLE 2

The effect of 3-iodotyrosine on blood pressure is shown by the following experiment. The blood pressure of normal rats is established by means of an automatic record on a Grass polygraph connected to a pressure transducer attached to a cannula in the femoral artery. 3-Iodotyrosine is administered in a dosage of 200 mg./kg. and the recording of the blood pressure is continued. After a brief disturbance the blood pressure steadies at a lower than normal level which is maintained for a long period of time.

The normal and drug-induced pressures for four rats is a follows:

| Before Administration | After Administration |
|---|---|
| 130/90 | 100/60 |
| 160/120 | 110/90 |
| 170/110 | 150/90 |
| 130/100 | 100/60 |

The effect of the drug on suppressing the pressor response to tyramine is tested by the same procedure except that the rats are treated I.V. both before the iodotyrosine is administered and after said administration with 0.3 mg./kg. of tyramine. The increase in blood pressure is observed and is cited below in each case. The rat is allowed to return to normal blood pressure after the first tyramine treatment before the iodotyrosine is injected and the lowered blood pressure is allowed to level off before the second administration of tyramine. The blood pressure increases are as follows:

| Normal Rat | Rat Dosed with 200 mg./kg. of 3-iodotyrosine |
|---|---|
| 50 | 20 |
| 60 | 20 |
| 60 | 10 |

EXAMPLE 3

CAPSULES

| Components | Mg./Capsule | Mg./Capsule | Mg./Capsule |
|---|---|---|---|
| 3-iodotyrosine | 50–500 | | |
| 3,5-diiodotyrosine | | 50–500 | |
| α-Methylphenylalanine | | | 50–500 |
| Magnesium stearate, U.S.P. | 1–3 | 1–3 | 1–3 |
| Starch | q.s. for satisfactory capsule fill | | |

The components are blended and filled into hard gelatin capsules in conventional manner.

EXAMPLE 4

TABLETS

| Components | Mg./Tablet | Mg./Tablet |
|---|---|---|
| 3-iodotyrosine | 50–500 | |
| α-Methylphenylalanine | | 50–500 |
| Citric acid, anhydrous | 5 | 5 |
| Calcium disodium editate, U.S.P. | 0.2 | 0.2 |
| Ethyl cellulose, N.F. | 30 | 30 |
| Guar gum | 15 | 15 |
| Cellulose, pure | 12 | 12 |
| Silica powder | 2 | 2 |
| Magnesium stearate, U.S.P. | 2.5 | 2.5 |
| Dicalcium phosphate, N.F. | Sufficient to balance formula when the amount of active ingredient is less than 500 mg. | |

The active ingredient, citric acid, calcium disodium editate, dicalcium phosphate, and a portion of the ethylcellulose are blended. The mixture is made into granules by incorporating the remaining ethylcellulose dissolved in anhydrous alcohol (8% solution). After drying, the granules are reduced in size by milling and mixed with the other components and compressed into tablets in conventional manner.

EXAMPLE 5

INJECTABLE SUSPENSIONS

| Components | Mg./ml. | Mg./ml. |
|---|---|---|
| α-Methylphenylalanine | 10–25 | |
| 3-iodotyrosine | | 10–25 |
| Polysorbate 80 | 4 | 4 |
| Sodium chloride, U.S.P. | 9 | 9 |
| Benzyl alcohol | 9 | 9 |
| Sodium carboxymethyl cellulose | 5 | 5 |
| Ethylenediamine tetraacetic acid, disodium | 2 | 2 |
| Water-for-injection | q.s. | q.s. |

All the components except the active ingredient are dissolved in the appropriate amount of water-for-injection, and the solution sterilized by autoclaving The active ingredient, as a sterile solid, is added aseptically to the autoclaved solution and aseptically blended to give a homogeneous suspension. The product is then filled into sterile containers in conventional manner.

We claim:

1. The method of reducing blood pressure by inhibiting the hydroxylation of

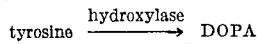

in the enzymatic sequential reaction of the amino acid tyrosine to the pressor amine epinephrine by the administration to warm blooded animals of from about 25 to about 500 milligrams per unit dose of a compound selected from the group consisting of α-methylphenylalanine, 3-iodotyrosine and 3,5-diiodotyrosine and nontoxic salts thereof.

2. The method of claim 1 wherein the compound is 3,5-diiodotyrosine.

3. The method of claim 1 wherein the compound is 3-iodotyrosine.

4. The method of claim 1 wherein the compound is α-methylphenylalanine.

5. The method according to claim 1, wherein the compound is administered to warm blooded animals in a daily regimen of about 50 to about 2000 milligrams.

References Cited

UNITED STATES PATENTS 3,230,143   1/1966   Marcus _____ 167—654

OTHER REFERENCES

Hartman: Journal of Biological Chemistry, vol. 216, pp. 507–513 and 527–529, 1965.

Umbreit: Chemical Abstracts, vol. 49, col. 7027(f), 1955.

Ljunggren, et al.: Chemical Abstracts, vol. 59, col. 7794(d), 1963.

Scharf: Chemical Abstracts, vol. 61, col. 9741(d), as indexed in Chemical Abstracts Index, vol. 61(J–Z), p. 2727–S, 1964.

McKenzie: Chemical Abstracts, vol. 61, col. 12284–12285, as indexed in Chemical Abstracts Subject Index, vol. 61(J–Z), p. 2727–C, 1964.

ALBERT T. MEYERS, *Primary Examiner.*

JULIAN S. LEVITT, *Examiner.*

L. B. RANDALL, *Assistant Examiner.*